(12) United States Patent
Mohtadi et al.

(10) Patent No.: US 12,469,884 B2
(45) Date of Patent: Nov. 11, 2025

(54) ELECTROLYTES WITH LOW CATIONIC MOBILITY ACTIVATION ENERGIES

(71) Applicant: Toyota Motor Engineering & Manufacturing North America, Inc., Plano, TX (US)

(72) Inventors: Rana Mohtadi, Northville, MI (US); Hiroko Kuwata, Ann Arbor, MI (US); Oscar Tutusaus, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 717 days.

(21) Appl. No.: 17/846,334

(22) Filed: Jun. 22, 2022

(65) Prior Publication Data
US 2023/0420740 A1    Dec. 28, 2023

(51) Int. Cl.
*H01M 10/0568* (2010.01)
*H01M 10/052* (2010.01)
(Continued)

(52) U.S. Cl.
CPC ..... *H01M 10/0568* (2013.01); *H01M 10/052* (2013.01); *H01M 10/0562* (2013.01);
(Continued)

(58) Field of Classification Search
CPC .... H01M 4/00; H01M 50/00; H01M 2300/00; H01M 2300/0048; H01M 10/0568; H01M 10/399
(Continued)

(56) References Cited

U.S. PATENT DOCUMENTS

| | | | |
|---|---|---|---|
| 8,685,571 B2 * | 4/2014 | Fukunaga | H01M 50/417 |
| | | | 429/246 |
| 10,553,897 B2 | 2/2020 | Udovic | |

(Continued)

FOREIGN PATENT DOCUMENTS

KR       101122159 B1 *   3/2012   ........ H01M 10/052

OTHER PUBLICATIONS

Green, M., et al. Influence of Solvent System on the Electrochemical Properties of a closo-Borate Electrolyte Salt. Appl. Sci. 2022, 12, 2273. https://doi.org/10.3390/app12052273 Abstract and pag. 2; par. 3-4 (Year: 2022).*

(Continued)

*Primary Examiner* — Jonathan Crepeau
*Assistant Examiner* — Gilberto Ramos Rivera
(74) *Attorney, Agent, or Firm* — Christopher G. Darrow; Darrow Mustafa PC

(57) ABSTRACT

An electrolyte includes a composite salt mixture formed from a halogen-free closo-borate salt and a halogenated closo-borate salt. The halogen-free closo-borate salt includes a first cation selected from $Li^+$, $Na^+$, $Mg^{2+}$, or $Ca^{2+}$, and a closo-borate anion with the structure $[B_yH_{(y-z)}R_z]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, or $[C_2B_{(y-3)}H_{(y-t-1)}R_t]^{2-}$, and a second cation selected from $Li^+$, $Na^+$, $Mg^{2+}$, or $Ca^{2+}$, and a halogenated closo-borate anion with the structure $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, or $[C_2B_{(y-3)}H_{(y-t-j-1)}R_tX_j]^{2-}$. The parameter y is an integer within a range of 6 to 12, z is an integer within a range of 0 to y, t is an integer within a range of 0 to (y−1), z+i is an integer within a range of 0 to y, t+j is an integer within a range of 0 to y−1, R is a linear, branched-chain, or cyclic C1-C18 alkyl or fluoroalkyl group, and X is F, Cl, Br, and/or I.

20 Claims, 3 Drawing Sheets

(51) Int. Cl.
*H01M 10/0562* (2010.01)
*H01M 10/39* (2006.01)

(52) U.S. Cl.
CPC .. *H01M 10/399* (2013.01); *H01M 2300/0048* (2013.01); *H01M 2300/0065* (2013.01)

(58) Field of Classification Search
USPC ........................................................ 429/188
See application file for complete search history.

(56) References Cited

U.S. PATENT DOCUMENTS

| | | | |
|---|---|---|---|
| 2006/0216612 A1 | 9/2006 | Jambunathan et al. | |
| 2007/0072085 A1 | 3/2007 | Chen et al. | |
| 2016/0372786 A1* | 12/2016 | Udovic, IV | H01M 10/0562 |
| 2020/0343580 A1* | 10/2020 | Yushin | H01M 10/0565 |
| 2020/0381776 A1 | 12/2020 | Mohtadi et al. | |
| 2020/0381777 A1 | 12/2020 | Mohtadi et al. | |
| 2021/0300773 A1 | 9/2021 | Nogami et al. | |
| 2021/0313617 A1* | 10/2021 | Yushin | H01M 4/366 |
| 2021/0408587 A1* | 12/2021 | Mohtadi | H01M 10/0564 |
| 2022/0017375 A1* | 1/2022 | Tutusaus | H01M 10/0525 |

OTHER PUBLICATIONS

Li, S., et al. "Halogenated sodium/lithium monocarba-closo-decaborates: syntheses, characterization, and solid-state ionic conductivity." Materials Chemistry Frontiers 5.22 (2021): 8037-8046. DOI: 10.1039/d1qm01066b Pag. 8037; par. 1-2 (Year: 2021).*

Li, S., et al. "Iodine-substituted lithium/sodium closo-decaborates: syntheses, characterization, and solid-state ionic conductivity." ACS Applied Materials & Interfaces 13.15 (2021): 17554-17564. https://doi.org/10.1021/acsami.1c01659 Pag. 17555; par. 1 (Year: 2021).*

Zachariah, M., et al. "Self-diffusion, phase behavior, and Li+ ion conduction in succinonitrile-based plastic cocrystals." The Journal of Physical Chemistry C 119.49 (2015): 27298-27306. Abstract and Fig. 3 (Year: 2015).*

KR 101122159 B1—Espacenet Machine Translation, retrieved Mar. 2025 (Year: 2025).*

Zhang, Z., et al. "Targeting superionic conductivity by turning on anion rotation at room temperature in fast ion conductors." Matter 2.6 (2020): 1667-1684. Abstract (Year: 2020).*

Tang et al., "Unparalleled lithium and sodium superionic conduction in solid electrolytes with large monovalent cage-like anions," vol. 8, issue 12, Oct. 8, 2015, pp. 3637-3645.

* cited by examiner

ELECTROLYTES WITH LOW CATIONIC MOBILITY ACTIVATION ENERGIES

TECHNICAL FIELD

The present disclosure generally relates to electrolytes, and particularly to electrolytes for lithium, sodium, magnesium or calcium batteries.

BACKGROUND

Solid-state electrolytes provide many advantages in secondary battery design, including mechanical stability, no volatility, and ease of construction. Typical inorganic solid-state electrolytes having high ionic conductivity are sulfides-based electrolytes. For example, Zhang et al. reported that the ionic conductivity for a sulfide electrolyte can exceed 25 mS/cm, which is advantageous for battery applications (Zhang Z et al. Energy Environ. Sci., 2018, 11, 1945). However, sulfide-based electrolytes suffer from the high propensity to form $H_2S$ toxic gases upon exposure to low level of moisture, which challenges their practical use. Other classes such as polymeric and other organic have inferior ionic mobility at technologically relevant temperatures below 60° C.

The present disclosure addresses these issues with solid-state electrolytes, and other issues related to electrolytes.

SUMMARY

In one form of the present disclosure, an electrolyte includes a composite salt mixture with a halogen-free closo-borate salt and a halogenated closo-borate salt. The halogen-free closo-borate salt includes a first cation selected from $Li^+$, $Na^+$, $Mg^{2+}$, and $Ca^{2+}$, and a closo-borate anion with the structure $[B_yH_{(y-z)}R_z]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, or $[C_2B_{(y-3)}H_{(y-t-1)}R_t]^{2-}$, and where y is an integer within a range of 6 to 12, z is an integer within a range of 0 to y, t is an integer within a range of 0 to (y−1), and R is a linear, branched-chain, or cyclic C1-C18 alkyl or fluoroalkyl group. The halogenated closo-borate salt includes a second cation selected from $Li^+$, $Na^+$, $Mg^{2+}$, and $Ca^{2+}$, and a halogenated closo-borate anion with the structure $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, or $[C_2B_{(y-3)}H_{(y-t-j-1)}R_tX_j]^{2-}$, and where y is an integer within a range of 6 to 12; (z+i) is an integer within a range of 0 to y, (t+j) is an integer within a range of 0 to (y−1), X is F, Cl, Br, I, or a combination thereof, and R is a linear, branched-chain, or cyclic C1-C18 alkyl or fluoroalkyl group. Alternatively, X can be a halogenated alkyl group including $CF_3$. In addition, the composite salt mixture has an activation energy less than 0.65 eV at 30° C.

In another form of the present disclosure, an electrolyte includes a composite salt mixture with a halogen-free closo-borate salt and a halogenated closo-borate salt. The halogen-free closo-borate salt includes a first cation selected from $Li^+$, $Na^+$, and $Mg^{2+}$, and $Ca^{2+}$, and a closo-borate anion with the structure $[B_yH_{(y-z)}R_z]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, or $[C_2B_{(y-3)}H_{(y-t-1)}R_t]^{2-}$, and where y is an integer within a range of 6 to 12, z is an integer within a range of 0 to y, t is an integer within a range of 0 to (y−1), and R is a linear, branched-chain, or cyclic C1-C18 alkyl or fluoroalkyl group. The halogenated closo-borate salt includes a second cation selected from $Li^+$, $Na^+$, $Mg^{2+}$, and $Ca^{2+}$, and a halogenated closo-borate anion with the structure $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, or $[C_2B_{(y-3)}H_{(y-t-j-1)}R_tX_j]^{2-}$, and where y is an integer within a range of 6 to 12; (z+i) is an integer within a range of 0 to y, (t+j) is an integer within a range of 0 to (y−1), X is F, Cl, Br, I, or a combination thereof, and R is a linear, branched-chain, or cyclic C1-C18 alkyl or fluoroalkyl group. Alternatively, X can be a halogenated alkyl group including $CF_3$. In addition, the composite salt mixture exhibits a cationic conductivity that is at least one order of magnitude greater than a cationic conductivity of the halogen-free closo-borate salt and a cationic conductivity of the halogenated closo-borate salt.

In still another form of the present disclosure, an electrolyte includes a composite salt mixture of $LiCB_{11}H_{12}$ and $LiCB_{11}H_{11}X$, where X is F or Cl. In some variations, the composite salt mixture exhibits a cationic conductivity that is at least two orders of magnitude greater than a cationic conductivity of the $LiCB_{11}H_{12}$ salt and at least one order of magnitude greater than a cationic conductivity of the $LiCB_{11}H_{11}X$ salt, and an activation energy less than 0.28 eV at 30° C.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

Figure 1:
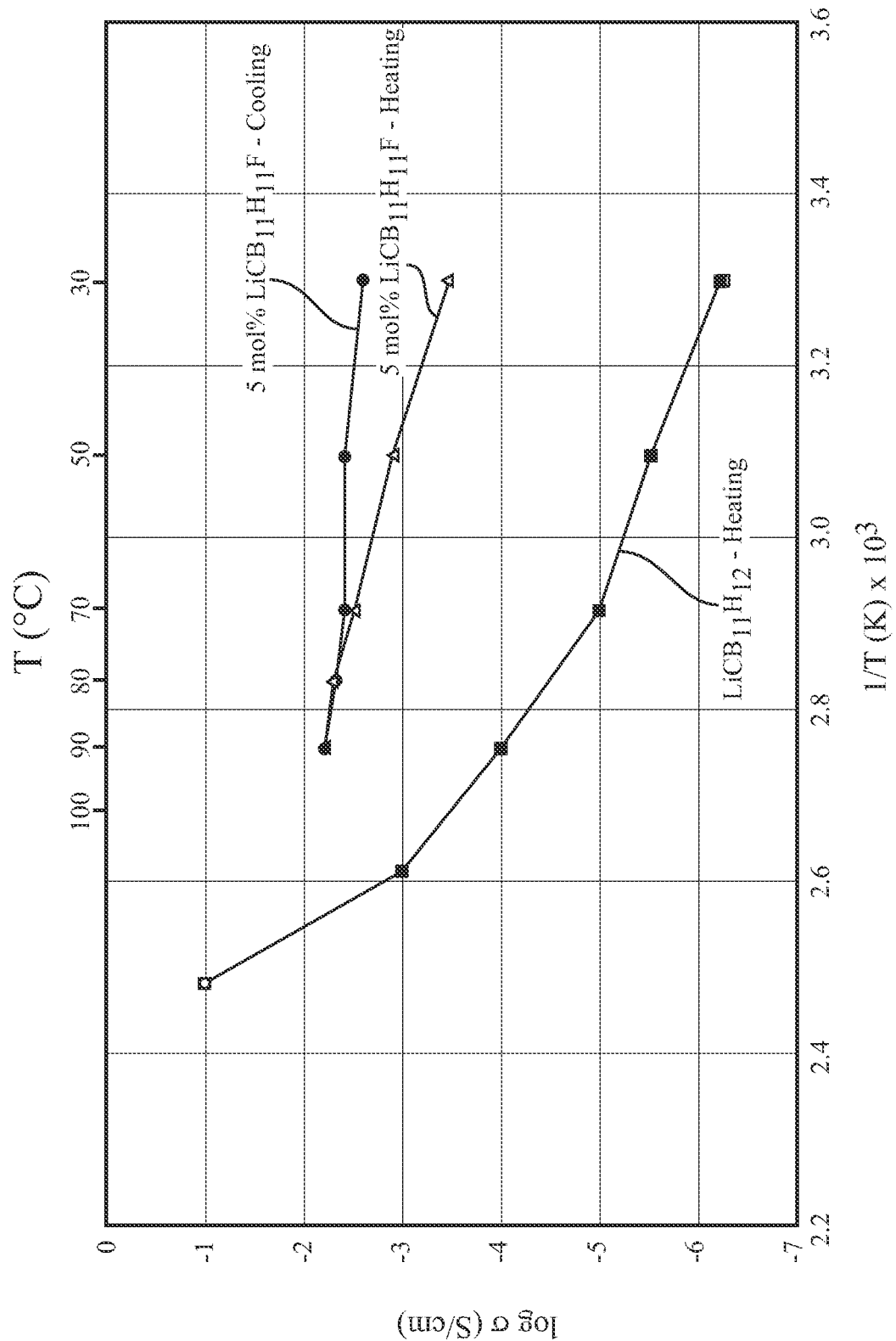
FIG. 1 is an Arrhenius plot of cationic conductivity versus temperature for a halogen-free closo-borate salt, and a composite salt mixture of the halogen-free closo-borate salt and the halogenated closo-borate salt according to the teachings of the present disclosure.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

In an effort to overcome the issues related to sulfide-based electrolytes noted above, polymeric electrolytes and other organic electrolytes have been studied but found to exhibit inferior ionic mobility at technologically relevant temperatures below 60° C. And recently, closo-borates salts have been reported to possibly form supertonic conductors at above 50° C., and for many of these salts at above 120° C. In some instances, these super conductor high temperature phases can be stabilized at room temperature for limited closo-borate salts (e.g., see U.S. Pat. No. 10,553,897; Kim S. et al. Nature Communications 10:1081, 2019; Tang W. S. et al. ACS Energy Lett. 2016, 1, 659-664). However, such an approach is problematic as the ionic conduction property, which includes the activation energy, is dictated by the intrinsic property and structural features of the high temperature phases. In fact, salts of closo borates, and also most polymeric and other solid-state inorganic electrolytes, generally exhibit relatively high activation energies for cationic mobility at temperatures below 60° C., which in turn implies a strong effect of the temperature on cationic mobility—a property not desired for device operation. For example, the lowest activation energy for a room temperature superionic closo-borate lithium cation conductor has been reported to be greater than 0.29 eV (Kim S. et al., Nature Communications 10:1081, 2019). And the activation energy for Li closo carborane salts exceeded 0.31 eV for temperatures above 39° C. and increased to 0.74 eV as these electrolytes were cooled below 39° C. (Tang W. S. et al. ACS Energy Lett. 2016, 1, 659-664).

In contrast to previous teachings, the present disclosure provides electrolytes with low activation energies (i.e., less than 0.65 eV) that include a composite salt mixture in which at least two different salts are in direct contact with each other. The composite salt mixture includes a combination of a halogen-free closo-borate salt and a halogenated closo-borate salt (also referred to herein simply as "combined halogen-free closo-borate/halogenated closo-borate salt") and the combined halogen-free closo-borate/halogenated closo-borate salt provides an electrolyte with a cationic conductivity that is at least one order of magnitude greater than a cationic conductivity of the halogen-free closo-borate salt, at least one order of magnitude greater than a cationic conductivity of the halogenated closo-borate salt, and low activation energies at room temperature (i.e., 20-22° C.). In addition, electrolytes according to the teachings of the present disclosure can exhibit and/or maintain relatively low activation energies even after cooling to sub-ambient temperatures.

In some variations of the present disclosure, the halogen-free closo-borate salt includes a cation selected from $Li^+$, $Na^+$, $Mg^{2+}$, and $Ca^{2+}$, and a closo-borate anion with the structure $[B_y H_{(y-z)} R_z]^{2-}$, $[CB_{(y-1)} H_{(y-z)} R_z]^-$, $[C_2 B_{(y-2)} H_{(y-t-1)} R_t]^-$, $[C_2 B_{(y-3)} H_{(y-t)} R_t]^-$, or $[C_2 B_{(y-3)} H_{(y-t-1)} R_t]^{2-}$, and where y is an integer within a range of 6 to 12, (z) is an integer within a range of 0 to y, (t) is an integer within a range of 0 to (y−1), and R is a linear, branched-chain, or cyclic C1-C18 alkyl or fluoroalkyl group. And in at least one variation, the halogenated closo-borate salt includes a cation selected from $Li^+$, $Na^+$, $Mg^{2+}$, and $Ca^{2+}$, and a closo-borate anion with the structure $[B_y H_{(y-z-i)} R_z X_i]^{2-}$, $[CB_{(y-1)} H_{(y-z-i)} R_z X_i]^-$, $[C_2 B_{(y-2)} H_{(y-t-j-1)} R_t X_j]^-$, $[C_2 B_{(y-3)} H_{(y-t-j)} R_t X_j]^-$, or $[C_2 B_{(y-3)} H_{(y-t-j-1)} R_t X_j]^{2-}$, and where y is an integer within a range of 6 to 12, (z+i) is an integer within a range of 0 to y, (t+j) is an integer within a range of 0 to (y−1), X is F, Cl, Br, I, or a combination thereof, and R is a linear, branched-chain, or cyclic C1-C18 alkyl or fluoroalkyl group. In the alternative, X is a halogenated alkyl group containing $CF_3$. For example, in some variations the closo-borate anion of the halogen-free closo-borate salt and/or the halogenated closo-borate salt is $B_{12}H_{12}^{-2}$, $B_{10}H_{10}^{-2}$, $CB_{11}H_{12}^{-1}$ or $CB_9H_{10}^{-1}$, or a substituted derivative thereof. It should be understood that the large sizes of the closo-borates anions, such as $B_{12}H_{12}^{-2}$, $B_{10}H_{10}^{-2}$, $CB_{11}H_{12}^{-1}$ and $CB_9H_{10}^{-1}$, are attractive for solid-state batteries since such anions display orientation mobility and a dynamic frustration that allows order-disorder phase transitions, which in turn leads to high cation mobility for enhanced ion conduction.

A cation of the of the halogen-free closo-borate salt can be the same or different than a cation of the halogenated closo-borate salt. Accordingly, an electrolyte formulation with the composite salt mixture can include multiple different closo-borate anions and multiple different cations. The mole percentage (mol %) of the $Li^+$, $Na^+$, $Mg^{2+}$, and/or $Ca^{2+}$ cation(s)s of the total cations in the electrolyte can be from about 1 to about 100 percent and the mole percentage of closo-borate anions of all anions of the electrolyte can be from about 0.5 to about 100 percent.

In some variations, an electrolyte with the composite salt mixture can include one or more additional cation conductivity enhancing anions. A mole fraction of the one or more additional conductivity enhancing anion to the total anions in the composite salt mixture can be from about 0.01 to about 0.9. Also, the one or more additional conductivity enhancing anions can be selected from $F^-$, $Cl^-$, $Br^-$, $I^-$, $R_x BF_{4-x}^-$, $R_y PF_{6-y}^-$, $SbF_6^-$, $ClO_4^-$, $SO_4^{-2}$, $N(SO_2 F)_2^-$, $N(SO_2(CF_2)_n(CF_3))_2^-$, $[NSO_2(CF_2)_{n+1} SO_2]^-$, or $CF_3(CF_2)_n SO_3^-$, where: n is 0 to 5; x is 0 to 4; y is 0 to 6; and R is a linear, branched, or cyclic alkyl group that can be unsubstituted, partially fluorinated, or fully fluorinated.

In at least one variation, an electrolyte is formulated from the combined halogen-free closo-borate/halogenated closo-borate salt with an addition of an organic plastic crystal such that a soft solid electrolyte with appreciable cation conductivity(ies) is provided. The organic plastic crystal material can be a succinonitrile-glutaronitrile mixture where the mole percent of glutaronitrile is 15 to 96 mole % and the plastic state (i.e., the organic plastic crystal) promotes cation conductivities of more than $10^{-7}$ S/cm at 60° C. And in some variations, the electrolyte includes the combined halogen-free closo-borate/halogenated closo-borate salt, the organic plastic crystal, and the one or more additional cation conductivity enhancing anions.

In one form of the present disclosure, the combined halogen-free closo-borate/halogenated closo-borate salt is included in a solid-state electrolyte for a solid-state electrochemical device. In another form of the present disclosure, an electrolyte with the combined halogen-free closo-borate/halogenated closo-borate salt is in a partially liquid molten state at room temperature (i.e., 20-25° C.). And in still another form, an electrolyte with the combined halogen-free closo-borate/halogenated closo-borate salt in a fully liquid molten state at room temperature.

In some variations, a combined halogen-free closo-borate/halogenated closo-borate salt is prepared by combining or mixing appropriate amounts of a halogen-free closo-borate salt and a halogenated closo-borate salt using mechanochemical synthetic ball milling followed by an optional heat treatment of the ball milled material at temperatures less than 200° C. and an optional ball milling homogenization step. In other variations, a combined halogen-free closo-borate/halogenated closo-borate salt is prepared using solution-based synthesis in which appropriate amounts of a halogen-free closo-borate salt and a halogenated closo-borate salt are dissolved in a solvent (e.g., an ether solvent) followed by a solvent removal step and an optional ball milling homogenization step.

In some variations, an electrochemical device that includes an anode, a cathode, and an electrolyte with the combined halogen-free closo-borate/halogenated closo-borate salt in contact with the anode and the cathode is provided in the present disclosure. The electrochemical device can be a secondary battery or a subunit of a secondary battery. The anode is an electrode where alkali metal or alkali earth metal oxidation occurs during the device's discharge and where reduction occurs during the device's charge. Similarly, the cathode is an electrode where a cathode material reduction occurs during the device's discharge and a cathode material oxidation occurs during the device's charge.

Figure 2:
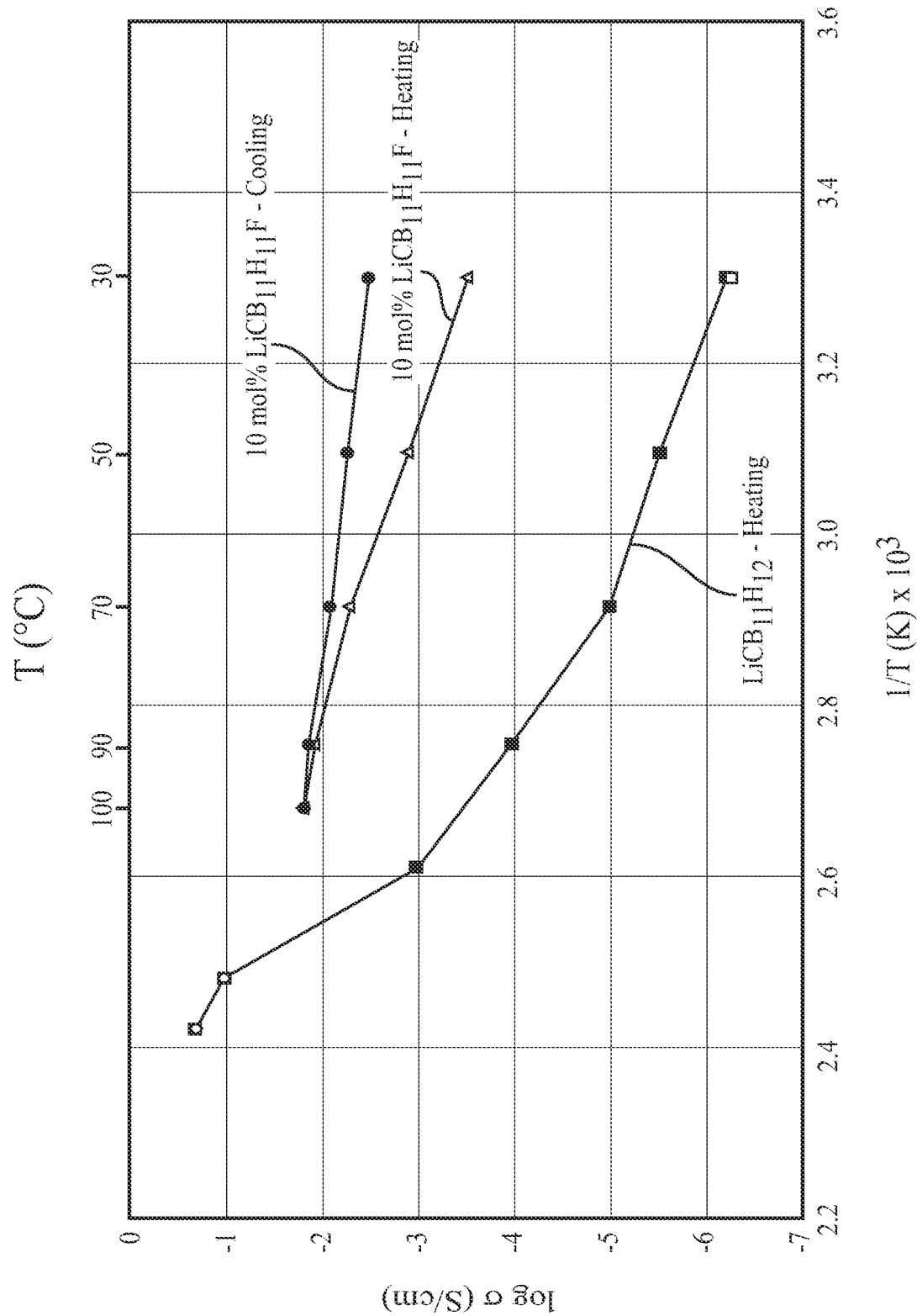
FIG. 2 is an Arrhenius plot of cationic conductivity versus temperature for a halogen-free closo-borate salt, and another composite salt mixture of the halogen-free closo-borate salt and the halogenated closo-borate salt according to the teachings of the present disclosure.

Referring now to FIGS. 1 and 2, Arrhenius plots of conductivity versus temperature for two combined halogen-free closo-borate/halogenated closo-borate salts according to the teachings of the present disclosure are shown. Particularly, FIG. 1 shows an Arrhenius plot for a combined 95 mol % $LiCB_{11}H_{12}$/5 mol % $LiCB_{11}H_{11}F$ salt subjected to cationic conductivity measurements at 30, 50, 70, 80, and 90° C. during heating of the combined 95 mol % $LiCB_{11}H_{12}$/5 mol % $LiCB_{11}H_{11}F$ salt (labeled "5 mol % $LiCB_{11}H_{11}F$—Heating") and cationic conductivity measurements at 90, 80, 70, 50, and 30° C. following the heating of the combined 95 mol % $LiCB_{11}H_{12}$/5 mol % $LiCB_{11}H_{11}F$ salt (labeled "5 mol % $LiCB_{11}H_{11}F$—Cooling"). FIG. 2 shows an Arrhenius plot for a combined 90 mol % $LiCB_{11}H_{12}$/10 mol % $LiCB_{11}H_{11}F$ salt subjected to cationic conductivity measurements at 30, 50, 70, 90, and 100° C. during heating (labeled "10 mol % $LiCB_{11}H_{11}F$—Heating") and cationic conductivity measurements at 100, 90, 70, 50, and 30° C. following the heating of the combined 90 mol % $LiCB_{11}H_{12}$/10 mol % $LiCB_{11}H_{11}F$ salt (labeled "10 mol % $LiCB_{11}H_{11}F$—Cooling"). And for comparison, FIGS. 1 and 2 also show cationic conductivities for neat $LiCB_{11}H_{12}$ during heating.

The combined 95 mol % $LiCB_{11}H_{12}$/5 mol % $LiCB_{11}H_{11}F$ salt and the combined 90 mol % $LiCB_{11}H_{12}$/10 mol % $LiCB_{11}H_{11}F$ salt were prepared by mixing $LiCB_{11}H_{12}$ and $LiCB_{11}H_{11}F$ salts with a mortar and pestle, followed by ball milling at 700 revolutions per minute (RPM) for 24 hours to ensure uniformity of the combined $LiCB_{11}H_{12}$/$LiCB_{11}H_{11}F$ salts. A solid-state electrolyte pellet for each of the combined $LiCB_{11}H_{12}$/$LiCB_{11}H_{11}F$ salts was formed by pressing a given $LiCB_{11}H_{12}$/$LiCB_{11}H_{11}F$ salt mixture under at least 120 MPa of pressure. Also, carbon coated aluminum foil was used as the working electrode and the counter electrode of a two-electrode cell, and a solid-state electrolyte pellet of the combined 95 mol % $LiCB_{11}H_{12}$/5 mol % $LiCB_{11}H_{11}F$ salt or the combined 90 mol % $LiCB_{11}H_{12}$/10 mol % $LiCB_{11}H_{11}F$ salt was in direct contact with the working and counter electrodes during cationic conductivity measurements.

Referring particularly to FIG. 1, the combined 95 mol % $LiCB_{11}H_{12}$/5 mol % $LiCB_{11}H_{11}F$ salt exhibited cationic conductivities of about $4 \times 10^{-4}$ S/cm at 30° C. initially. In contrast, the neat $LiCB_{11}H_{12}$ salt exhibited cationic conductivities initially of about $6.3 \times 10^{-7}$ S/cm at 30° C. In addition, an increase in cationic conductivity of the combined 95 mol % $LiCB_{11}H_{12}$/5 mol % $LiCB_{11}H_{11}F$ salt after heat treatment and an extremely low activation energy of 0.209 eV can be obtained. Accordingly, the cationic conductivity of the combined 95 mol % $LiCB_{11}H_{12}$/5 mol % $LiCB_{11}H_{11}F$ salt at 30° C. was greater than 1000 times the cationic conductivity of the $LiCB_{11}H_{12}$.

Referring particularly to FIG. 2, the combined 90 mol % $LiCB_{11}H_{12}$/10 mol % $LiCB_{11}H_{11}F$ salt exhibited cationic conductivities initially of about $3.1 \times 10^{-4}$ S/cm at 30° C. and about $3.4 \times 10^{-3}$ S/cm at 30° C. following the heating cycle. In contrast, the neat $LiCB_{11}H_{12}$ salt exhibited cationic conductivities of about $6.3 \times 10^{-7}$ S/cm at 30° C. Accordingly, the cationic conductivity of the combined 90 mol % $LiCB_{11}H_{12}$/10 mol % $LiCB_{11}H_{11}F$ at 30° C. salt was greater than 100 times the cationic conductivity of the $LiCB_{11}H_{12}$. In addition, the cationic conductivity of the combined 90 mol % $LiCB_{11}H_{12}$/10 mol % $LiCB_{11}H_{11}F$ salt can be further increased to $3.4 \times 10^{-3}$ S/cm at 30° C. after heat treatment and an extremely low activation energy of 0.209 eV can be obtained.

Figure 3:
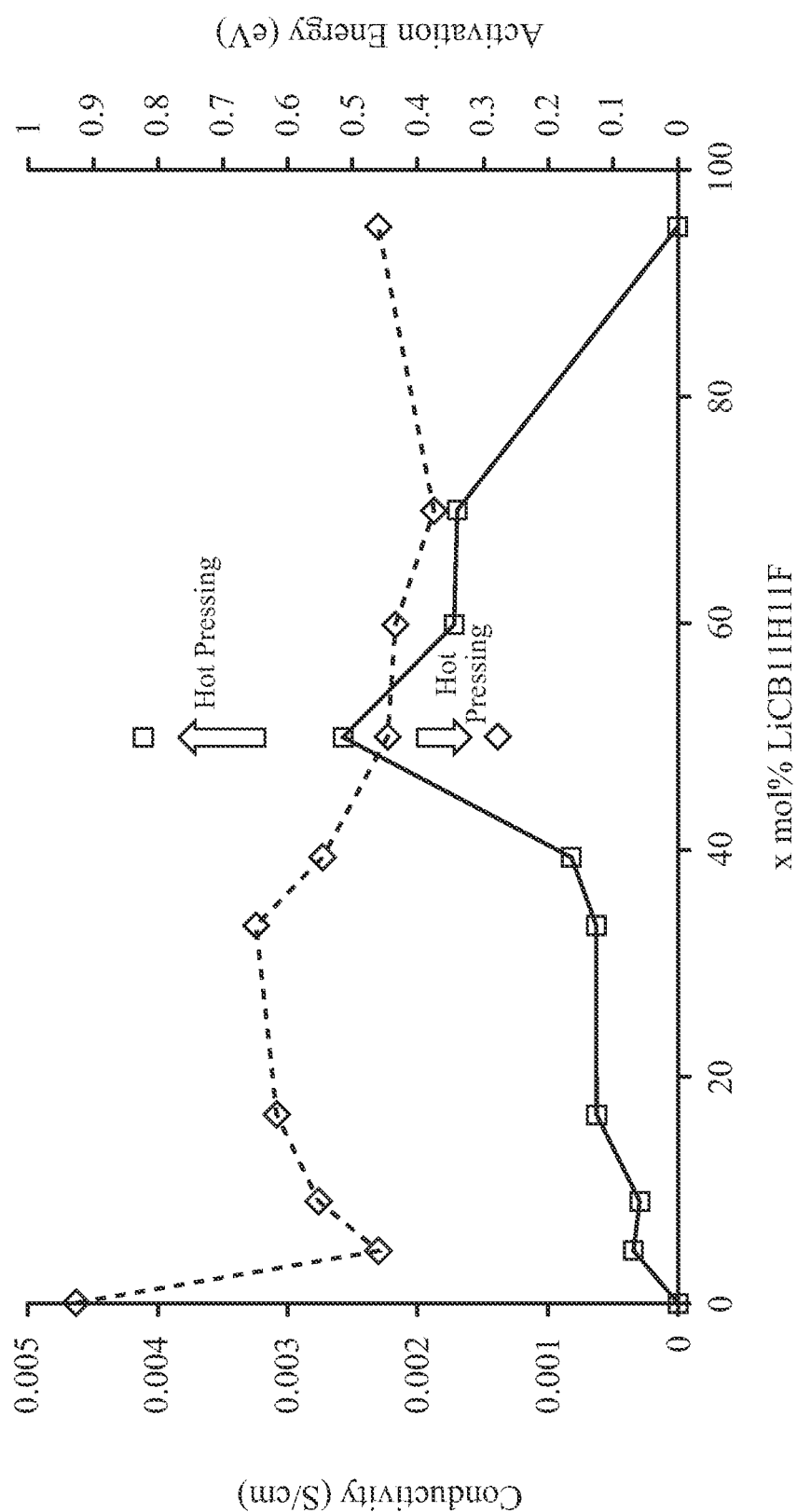
FIG. 3 is a plot of cationic conductivity and activation energy versus % molar content of the halogenated closo-borate salt $LiCB_{11}H_{11}F$ in a $LiCB_{11}H_{12}$—$LiCB_{11}H_{11}F$ composite salt mixture.

Referring now to FIG. 3, a plot of conductivity and activation energy at 30° C. for a plurality $LiCB_{11}H_{12}$—$LiCB_{11}H_{11}F$ compositions is shown. The compositions were cold pressed and not subjected to thermal activation, except for the two data points shown for a $LiCB_{11}H_{12}$/50 mol % $LiCB_{11}H_{11}F$ composition. And as observed from FIG. 3, the conductivity of 100 mol % $LiCB_{11}H_{12}$ and $LiCB_{11}H_{12}$/95 mol % $LiCB_{11}H_{11}F$ is very low compared to desired compositions of $LiCB_{11}H_{12}$ and $LiCB_{11}H_{12}$ For example, compositions such as $LiCB_{11}H_{12}$/50 mol % $LiCB_{11}H_{11}F$ can be greater than 1000 times that of 100 mol % $LiCB_{11}H_{12}$ and greater than 1000 times that of 100 mol % $LiCB_{11}H_{11}F$. In addition, the plot of conductivity versus composition illustrated a specific range or "sweet spot" of compositions that provide enhanced conductivity at 30° C. In some variations the range of compositions that provide enhanced conductivity is between about $LiCB_{11}H_{12}$/40 mol % $LiCB_{11}H_{11}F$ and about $LiCB_{11}H_{12}$/80 mol % $LiCB_{11}H_{11}F$, while in other variations the range is between about $LiCB_{11}H_{12}$/45 mol % $LiCB_{11}H_{11}F$ and about $LiCB_{11}H_{12}$/75 mol % $LiCB_{11}H_{11}F$. And in at least one variation the range of compositions that provide enhanced conductivity is between about $LiCB_{11}H_{12}$/45 mol % $LiCB_{11}H_{11}F$ and about $LiCB_{11}H_{12}$/70 mol % $LiCB_{11}H_{11}F$. In addition, the $LiCB_{11}H_{12}$/50 mol % $LiCB_{11}H_{11}F$ composition was further hot pressed and this hot pressed composition exhibited an even higher conductivity (almost two time greater) compared to the $LiCB_{11}H_{12}$/50 mol % $LiCB_{11}H_{11}F$ composition without hot pressing.

Still referring to FIG. 3, and regarding the activation energy for the plurality $LiCB_{11}H_{12}$—$LiCB_{11}H_{11}F$ compositions, all of the tested $LiCB_{11}H_{12}$—$LiCB_{11}H_{11}F$ compositions that included $LiCB_{11}H_{11}F$ exhibited an activation energy less than 0.65 eV at 30° C. In some variations (i.e., for some compositions), the activation energy was less than 0.61 EV, while in other variations the activation energy was less than 0.58 eV. In at least one variation the activation energy was less than 0.51 eV, and in some variations the activation energy was less than 0.47 eV, for example, less than 0.42 eV and less than 0.40 eV. And for the $LiCB_{11}H_{12}$—50 mol % $LiCB_{11}H_{11}F$ composition that was further hot pressed, this sample exhibited an activation energy less than 0.33 eV.

Accordingly, it should be understood that a simply or random combination of a halogen-free closo-borate salt and a halogenated closo-borate salt does not inherently provide the combined halogen-free closo-borate/halogenated closo-borate salts according to the teachings of the present disclosure. Stated differently, a specific range of compositions according to the teachings of the present disclosure provide a composite salt with enhanced conductivity and low activation energy.

It should be understood from FIGS. 1, 2, and 3 that the combined halogen-free closo-borate/halogenated closo-borate salts according to the teachings of the present disclosure have or exhibit a cationic conductivity that is at least one order of magnitude greater than a cationic conductivity of the halogen-free closo-borate salt and/or at least one order of magnitude greater than a cationic conductivity of the halogenated closo-borate salt. In some variations, the combined halogen-free closo-borate/halogenated closo-borate salts according to the teachings of the present disclosure have or exhibit a cationic conductivity that is at least two orders of magnitude greater than the cationic conductivity of the halogen-free closo-borate salt and/or at least two orders of magnitude greater than the cationic conductivity of the halogenated closo-borate salt. And in at least one variation, the combined halogen-free closo-borate/halogenated closo-borate salts according to the teachings of the present disclosure have or exhibit a cationic conductivity that is between two and three orders of magnitude greater than the cationic conductivity of the halogen-free closo-borate salt and/or between two and three orders of magnitude greater than the cationic conductivity of the halogenated closo-borate salt, and an activation energy less than 0.28 eV.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrolyte comprising:
    a composite salt mixture comprising between 0.975 and 0.05 mole fraction of a halogen-free closo-borate salt, between 0.025 and 0.95 mole fraction of a halogenated closo-borate salt, and
    an activation energy less than 0.65 EV at 30° C.

2. The electrolyte according to claim 1, wherein the composite salt mixture comprises a cationic conductivity that is at least one order of magnitude greater than a cationic conductivity of the halogen-free closo-borate salt and a cationic conductivity of the halogenated closo-borate salt at temperatures below 125° C.

3. The electrolyte according to claim 1, wherein the halogen-free closo-borate salt comprises a first cation selected from the group consisting of $Li^+$, $Na^+$, $Mg^{2+}$, and $Ca^{2+}$ and the halogenated closo-borate salt comprises a second cation selected from the group consisting of $Li^+$, $Na^+$, $Mg^{2+}$, and $Ca^{2+}$.

4. The electrolyte according to claim 3, wherein:
    the halogen-free closo-borate salt comprises:
        a $Li^+$ cation and a closo-borate anion having a structure selected from the group consisting of:
            $[B_yH_{(y-z)}R_z]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, and $[C_2B_{(y-3)}H_{(y-t-1)}R_t]^{2-}$, and wherein:
            y is an integer within a range of 6 to 12;
            (z) is an integer within a range of 0 to y;
            (t) is an integer within a range of 0 to (y−1); and
        R is a linear, branched-chain, or cyclic C1-C18 alkyl or fluoroalkyl group; and
    the halogenated closo-borate salt comprises:
        a $Li^+$ and a halogenated closo-borate anion having the structure selected from the group consisting of:
            $[B_yH_{(y-z-i)}R_zX_j]^{2-}$, $[CB_{(y-1)}H_{(y-z-i)}R_zX_i]^-$, $[C_2B_{(y-2)}H_{(y-t-j-1)}R_zX_j]^-$, $[C_2B_{(y-3)}H_{(y-t-j)}R_tX_j]^-$, and $[C_2B_{(y-3)}H_{(y-t-j-1)}R_tX_j]^{2-}$, and wherein:
            y is an integer within a range of 6 to 12;
            (z+i) is an integer within a range of 0 to y;
            (t+j) is an integer within a range of 0 to (y−1);
            X is F, Cl, Br, I, halogenated alkyl group including $CF_3$, or a combination thereof; and
        R is a linear, branched-chain, or cyclic C1-C18 alkyl or fluoroalkyl group.

5. The electrolyte according to claim 4, wherein a cationic conductivity of the composite salt mixture at 30° C. is between two and three orders of magnitude greater than a cationic conductivity of the halogen-free closo-borate salt at 30° C., the cationic conductivity at 30° C. is at least one order of magnitude greater than a cationic conductivity of the halogenated closo-borate salt at 30° C., and the composite salt mixture has an activation energy less than 0.58 eV at 30° C.

6. The electrolyte according to claim 1 further comprising an organic plastic crystal, wherein the composite salt mixture is disposed within the organic plastic crystal.

7. The electrolyte according to claim 6, wherein the organic plastic crystal comprises a succinonitrile-glutaronitrile mixture.

8. The electrolyte according to claim 7, wherein the composite salt mixture comprises between 90 wt. % and 30 wt. % of the electrolyte and the organic plastic crystal comprises from about 10 wt. % to about 70 wt. % of the electrolyte.

9. The electrolyte according to claim 8 further comprising between about 0.01 mole fraction and about 0.9 mole fraction of at least one cation conductivity enhancing anion.

10. The electrolyte according to claim 9, wherein the at least one cation conductivity enhancing anion is selected from the group consisting of $F^-$, $Cl^-$, $Br^-$, $I^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_nCF_3)_2^-$, $[NSO_2(CF_2)_{n+1}SO_2]^-$, $CF_3(CF_2)_nSO_3^-$, and combinations thereof, where: n is 0 to 5; x is 0 to 4; y is 0 to 6; and R is a linear, branched, or cyclic alkyl group that can be partially fluorinated, or fully fluorinated.

11. The electrolyte according to claim 1, wherein the composite salt mixture is free of solvent.

12. The electrolyte according to claim 1, wherein the composite salt mixture is in a partially liquid molten state or a fully liquid molten state at room temperature.

13. The electrolyte according to claim 1, wherein the composite salt mixture is in a solid state at room temperature.

14. An electrolyte comprising:
   a composite salt mixture comprising:
      between 0.975 and 0.05 mole fraction of a halogen-free closo-borate salt comprising a first cation selected from the group consisting of $Li^+$, $Na^+$, $Mg^{2+}$, and $Ca^{2+}$, and a closo-borate anion having a structure selected from the group consisting of:
      $[B_yH_{(y-z)}R_z]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-1)}R_t]^-$, and $[C_2B_{(y-3)}H_{(y-t-1)}R_t]^{2-}$, and wherein:
         y is an integer within a range of 6 to 12;
         (z) is an integer within a range of 0 to y;
         (t) is an integer within a range of 0 to (y−1); and
         R is a linear, branched-chain, or cyclic C1-C18 alkyl group;
      between 0.025 and 0.95 mole fraction of a halogenated closo-borate salt comprising a second cation selected from the group consisting of $Li^+$, $Na^+$, and $Mg^{2+}$, $Ca^{2+}$ and a halogenated closo-borate anion having the structure selected from the group consisting of:
      $[B_yH_{(y-z-i)}R_zX_i]^{2-}$, $[CB_{(y-1)}H_{(y-z-i)}R_zX_i]^-$, $[C_2B_{(y-z)}H_{(y-t-j-1)}R_zX_j]^-$, $[C_2B_{(y-3)}H_{(y-t-j)}R_tX_j]^-$, and $[C_2B_{(y-3)}H_{(y-t-j-1)}R_tX_j]^{2-}$, and wherein:
         y is an integer within a range of 6 to 12;
         (z+i) is an integer within a range of 0 to y;
         (t+j) is an integer within a range of 0 to (y−1);
         X is F, Cl, Br, I, halogenated alkyl group including $CF_3$, or a combination thereof; and
         R is a linear, branched-chain, or cyclic C1-C18 alkyl or fluoroalkyl group,
      wherein the composite salt mixture comprises a cationic conductivity that is at least one order of magnitude greater than a cationic conductivity of the halogen-free closo-borate salt and a cationic conductivity of the halogenated closo-borate salt.

15. The electrolyte according to claim 14, wherein the first cation is $Li^+$ and the second cation is $Li^+$.

16. The electrolyte according to claim 15, wherein the composite salt mixture comprises between 0.95 and 0.05 mole fraction of the halogen-free closo-borate salt and between 0.025 and 0.95 mole fraction of the halogenated closo-borate salt.

17. The electrolyte according to claim 16, wherein the cationic conductivity of the composite salt mixture at 30° C. is between two and three orders of magnitude greater than the cationic conductivity of the halogen-free closo-borate salt at 30° C., the cationic conductivity of the composite salt mixture at 30° C. is at least one order of magnitude greater than the cationic conductivity of the halogenated closo-borate salt at 30° C., and the composite salt mixture has an activation energy less than 0.65 eV at 30° C.

18. An electrolyte comprising:
   a composite salt mixture of between 0.975 and 0.05 mole fraction $LiCB_{11}H_{12}$ and between 0.025 and 0.95 mole fraction $LiCB_{11}H_{11}X$, where X is F or Cl, wherein the composite salt mixture comprises a cationic conductivity at 30° C. between two and three orders of magnitude greater than a cationic conductivity of the $LiCB_{11}H_{12}$ at 30° C., the cationic conductivity at 30° C. is at least one order of magnitude greater than a cationic conductivity of the $LiCB_{11}H_{11}X$ at 30° C., and the composite salt mixture comprises an activation energy less than 0.65 eV at 30° C.

19. The electrolyte according to claim 18, wherein the composite salt mixture comprises between 0.975 and 0.05 mole fraction of the $LiCB_{11}H_{12}$ and between 0.025 and 0.95 mole fraction of the $LiCB_{11}H_{11}X$.

20. The electrolyte according to claim 18, wherein the composite salt mixture has an activation energy less than 0.58 eV at 30° C.

* * * * *